United States Patent
Dai et al.

(10) Patent No.: US 11,597,809 B2
(45) Date of Patent: Mar. 7, 2023

(54) METHOD FOR PREPARING NANO ATTAPULGITE AND PHENOLIC AEROGEL AND METHOD FOR PREPARING ABRASION-RESISTANT VEHICLE TIRE

(71) Applicants: Xiamen University, Fujian (CN); Cheng Shin Tire (Xiamen) Co., Ltd., Xiamen (CN)

(72) Inventors: Lizong Dai, Fujian (CN); Xiaohui Liu, Fujian (CN); Hesheng Cao, Xiamen (CN); Guorong Chen, Fujian (CN); Weiang Luo, Fujian (CN); Conghui Yuan, Fujian (CN); Birong Zeng, Fujian (CN); Yiting Xu, Fujian (CN)

(73) Assignee: Xiamen University, Fujian (CN)

( * ) Notice: Subject to any disclaimer, the term of this patent is extended or adjusted under 35 U.S.C. 154(b) by 0 days.

(21) Appl. No.: 17/666,852

(22) Filed: Feb. 8, 2022

(65) Prior Publication Data
US 2022/0251323 A1    Aug. 11, 2022

(30) Foreign Application Priority Data

Feb. 8, 2021 (CN) .......................... 202110186380.2

(51) Int. Cl.
| | |
|---|---|
| C08J 9/28 | (2006.01) |
| C08J 9/00 | (2006.01) |
| C08K 3/34 | (2006.01) |
| B01J 13/00 | (2006.01) |
| B60C 1/00 | (2006.01) |
| C08G 73/02 | (2006.01) |

(52) U.S. Cl.
CPC ............. *C08J 9/28* (2013.01); *B01J 13/0052* (2013.01); *B01J 13/0091* (2013.01); *B60C 1/00* (2013.01); *C08G 73/0233* (2013.01); *C08J 9/0066* (2013.01); *C08K 3/346* (2013.01); *C08G 2210/00* (2013.01); *C08J 2205/026* (2013.01); *C08J 2379/04* (2013.01)

(58) Field of Classification Search
CPC .... C08G 14/06; C08G 73/0233; C08G 73/22; B01J 13/0052; B01J 13/0065–0069; B01J 13/0091; C08J 2205/022–026
See application file for complete search history.

(56) References Cited

U.S. PATENT DOCUMENTS

2012/0231251 A1 *   9/2012   Kim .................... C08K 7/00
                                                     524/789

FOREIGN PATENT DOCUMENTS

| CN | 103599734 A | * | 2/2014 | |
|---|---|---|---|---|
| CN | 106632915 A | | 5/2017 | |
| CN | 106866997 A | | 6/2017 | |
| CN | 110813247 A | * | 2/2020 | ............. B01J 20/24 |
| WO | 2020069023 A1 | | 4/2020 | |

OTHER PUBLICATIONS

Ishida, H. and Ohashi S. Advanced and Emerging Polybenzoxazine Science and Technology. Elsevier, Inc. 2017. pp. 3-8. (Year: 2017).*

Almahdi, A. A. et al. Biobased Chitosan/Polybenzoxazine Cross-Linked Films: Preparation in Aqueous Media and Synergistic Improvements in Thermal and Mechanical Properties. Biomacromolecules, 2013, 14, 1806-1815. (Year: 2013).*

Machine Translation of CN110813247A. Feb. 21, 2020. (Year: 2020).*

Machine Translation of CN103599734A. Feb. 26, 2014. (Year: 2014).*

Alhwaige, A. A. et al. Chitosan/polybenzoxazine/clay mixed matrix composite aerogels: preparation, physical properties, and water absorbency. Applied Clay Science, 2020, 184, 105403. Available online Dec. 6, 2019. (Year: 2019).*

* cited by examiner

*Primary Examiner* — Stephen E Rieth
(74) *Attorney, Agent, or Firm* — Cooper Legal Group, LLC

(57) ABSTRACT

A method for preparing an aerogel comprising nano attapulgite and phenolic aldehyde and a method for preparing abrasion-resistant vehicle tire. 80-100 weight distributions of rubber, 3-8 weight distributions of $SiO_2 \cdot nH_2O$, 3-6 weight distributions of an anti-aging agent, 3-4 weight distributions of a heat stabilizer, 3-5 weight distributions of a compatibilizing agent, and 3-12 weight distributions of the aerogel comprising the nano attapulgite and the phenolic aldehyde is selected as a raw material of the abrasion-resistant rubber material to prepare rubber composite material for the abrasion-resistant vehicle tire.

6 Claims, 4 Drawing Sheets

METHOD FOR PREPARING NANO ATTAPULGITE AND PHENOLIC AEROGEL AND METHOD FOR PREPARING ABRASION-RESISTANT VEHICLE TIRE

RELATED APPLICATIONS

This application claims priority to Chinese patent application 202110186380.2, filed on Feb. 8, 2021. Chinese patent application 202110186380.2 is incorporated herein by reference.

FIELD OF THE DISCLOSURE

The present disclosure relates to a technical field of vehicle tire rubber, and in particular relates to a method for preparing an aerogel comprising nano attapulgite and phenolic aldehyde and a method for preparing an abrasion-resistant vehicle tire using the aerogel comprising the nano attapulgite and the phenolic aldehyde.

BACKGROUND OF THE DISCLOSURE

Vehicle tires are essential to modern transportation. Rubber composite material is the main component of vehicle tires. Abrasion resistance, flame retardancy, heat dissipation performance, wet skid resistance, energy saving, and environmental protection are all very important factors for the rubber.

The development of energy-saving and abrasion-resistant tires is of vital importance to the tire industry. Since 2012, the fuel efficiency of automobile tires has been regarded as one of the important indicators by EU tire-related regulations. Since the construction of highways in China in 1988, the scale has developed rapidly. As of the end of 2019, the total mileage of highways reached 149,600 Kilometers and ranks first in the world. The growth rate of the highways has slowed down in recent years, which also reflects that the domestic highway construction layout improves day by day. Therefore, it is necessary to develop energy-saving and abrasion-resistant tires with high efficiency and flame retardancy. The abrasion resistance and cutting resistance of tires are important factors related to the service life of tires and the driving safety of vehicles. The existing production routes of tire rubber can no longer meet the national requirements for high-performance and safe vehicle tire manufacturing. It is necessary to modify the abrasion resistance of tires to obtain tires with good abrasion resistance, strong flame retardancy, and suitability for long-distance and long-term transportation. In addition, compared to light-duty tires that run on normal roads, tires that are widely used in mines, construction sites, and heavy-duty loaders have higher requirements for the abrasion resistance and cutting resistance of the carcass material.

Nano attapulgite rustic gel is a kind of nano material with excellent performance. The higher porosity, expansion volume, and larger specific surface area of nano attapulgite rustic gel make nano attapulgite rustic gel have better dispersion characteristics than original attapulgite soil, and the excellent mechanical and thermal properties enable the nano attapulgite rustic gel to be used as a reinforcing material in rubber composite materials. However, the nano attapulgite rustic gel has strong hydrophilicity, high surface energy, and is prone to aggregation, which make it difficult to achieve uniform dispersion in rubber and which hinders the possibility of improving rubber properties.

BRIEF SUMMARY OF THE DISCLOSURE

An objective of the present disclosure is overcome deficiencies of existing techniques and to provide a method for preparing an aerogel comprising nano attapulgite and phenolic aldehyde.

Another objective of the present disclosure is to provide a method for preparing an abrasion-resistant rubber using the aerogel comprising the nano attapulgite and the phenolic aldehyde.

Still another objective of the present disclosure is to provide a heavy-duty vehicle tire made of the abrasion-resistant rubber.

A technical solution of the present disclosure is as follows.

A method for preparing an aerogel comprising nano attapulgite and phenolic aldehyde, comprising:

(1) dispersing bisphenol A, tetraethylenepentamine, and paraformaldehyde in 1,4-dioxane, stirring in an ice bath for 0.8-1.2 hours, heating to room temperature, continually stirring for 4-12 hours to obtain a monomer BA-TEPA, wherein a structural formula of the monomer BA-TEPA is as follows:

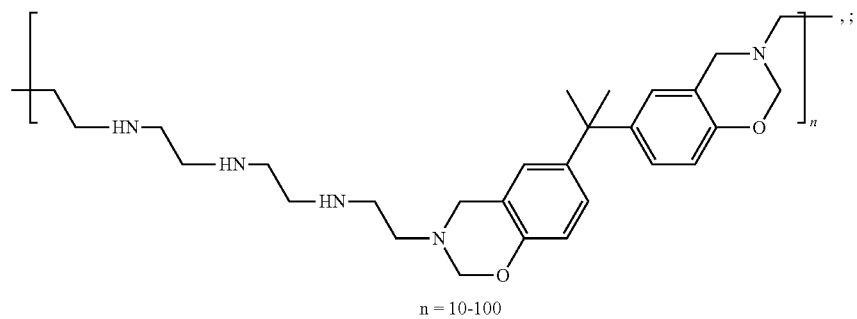

n = 10-100

(2) dispersing original attapulgite in ultrapure water, stirring for 0.8-1.2 hours, then adding oxalic acid, hydrothermally processing at 120-160° C. for 2-8 hours, then thermally processing at 80-140° C. for 10-40 hours to obtain nano attapulgite;

(3) sonicating to disperse the nano attapulgite prepared in step (2) in a 50/50 (vol/vol) water-ethanol solution, then adding chitosan and acetic acid, stirring for 20-25 hours, then adding the monomer BA-TEPA prepared in step (1), stirring, adding formaldehyde, stirring for 2-4 minutes, then leaving to stand to form a gel, and finally aging the gel to form a wet gel; and (4) after substituting the wet gel prepared in step (3) with a solvent with a volume ratio of ethanol and water of 1-3:100 for 3-4 days, freeze-drying to obtain the aerogel comprising the nano attapulgite and the phenolic aldehyde.

In a preferred embodiment, a ratio of the bisphenol A, the tetraethylenepentamine, the paraformaldehyde, and the 1,4-dioxane is 1 mol-4 mol: 1 mol-4 mol: 4 mol-16 mol: 100 mL-500 mL.

In a preferred embodiment, a mass ratio of the original attapulgite and the ultrapure water is 1:5-1:30, and the adding oxalic acid comprises adding the oxalic acid to a final concentration of 0.5-5 Mol/L.

In a preferred embodiment, the sonicating to disperse the nano attapulgite prepared in step (2) in a 50/50 (vol/vol) water-ethanol solution, then adding chitosan and acetic acid, stirring for 20-25 hours, then adding the monomer BA-TEPA prepared in step (1), stirring to even, then adding formaldehyde, stirring for 2-4 minutes, then leaving to stand to form a gel, and finally aging the gel to form a wet gel comprises sonicating to disperse the nano attapulgite prepared in step (2) in the 50/50 (vol/vol) water-ethanol solution, then adding 0.05-5 wt % of the chitosan and 0.05-5 volume % of the acetic acid, stirring for 20-25 hours, then adding the monomer BA-TEPA prepared in step (1), stirring, adding the formaldehyde, stirring for 2-4 minutes, then leaving to stand to form the gel, and finally aging the gel at 20-70° C. for 6-30 hours to form the wet gel.

In a preferred embodiment, a mass ratio of the nano attapulgite and the monomer BA-TEPA is 0.05-0.5:0.05-0.5.

In a preferred embodiment, a ratio of the nano attapulgite, the water-ethanol solution, and the formaldehyde is 0.05 g-0.5 g: 9 mL-11 mL: 50 μL-500 μL.

In a preferred embodiment, the aging the gel to form the wet gel comprises aging the gel at 20-70° C. for 6-30 hours.

Another technical solution of the present disclosure is as follows.

An abrasion-resistant rubber material, wherein a raw material of the abrasion-resistant rubber material comprises the aerogel comprising the nano attapulgite and the phenolic aldehyde prepared by the method.

In a preferred embodiment, the raw material of the abrasion-resistant rubber material comprises 80-100 weight distributions of rubber, 3-8 weight distributions of $SiO_2 \cdot nH_2O$, 3-6 weight distributions of an anti-aging agent, 3-4 weight distributions of a heat stabilizer, 3-5 weight distributions of a compatibilizing agent, and 3-12 weight distributions of the aerogel comprising the nano attapulgite and the phenolic aldehyde.

Still another technical solution of the present disclosure is as follows.

A heavy-duty vehicle tire, wherein the heavy-duty vehicle tire is made of the raw material comprising the abrasion-resistant rubber material.

The present disclosure has the following advantages.

1. The present disclosure uses nano attapulgite and chitosan as templates and uses formaldehyde as a crosslinking agent to prepare an aerogel comprising nano attapulgite and phenolic aldehyde, wherein the phenolic aldehyde obtained by ring-opened polymerization in-situ of a monomer BA-TEPA is used as the crosslinking agent to construct a flame-retardant composite aerogel material, a preparation step is simple, an operation of a synthesis method is easy, raw materials are low-cost and easily obtained, and a reaction condition is easily controlled.

2. The aerogel comprising the nano attapulgite and the phenolic aldehyde of the present disclosure has ultra-low density and can effectively reduce a weight of rubber composite material. An abrasion resistance of a vehicle tire is improved, and a flame retardant property of the vehicle tire is also improved at the same time. The aerogel comprising the nano attapulgite and the phenolic aldehyde satisfies requirements for high performance and safety in vehicle tire manufacturing and is especially suitable for a heavy-duty vehicle tire that has higher requirements for abrasion-resistance.

3. The aerogel comprising the nano attapulgite and the phenolic aldehyde of the present disclosure can not only solve an agglomeration problem of nano attapulgite in the existing techniques, but also a compatibility and a dispersibility of the nano attapulgite in rubber components are improved.

4. Compared with phenolic aldehyde and inorganic nano attapulgite, the aerogel comprising the nano attapulgite and the phenolic aldehyde of the present disclosure has higher cohesion force for rubber, so a bonding strength of the aerogel comprising the nano attapulgite and the phenolic aldehyde is much greater than a bonding strength of phenolic aldehyde particles.

5. After the aerogel comprising the nano attapulgite and the phenolic aldehyde of the present disclosure is formed, the aerogel comprising the nano attapulgite and the phenolic aldehyde can be used as a structural composite material to enhance mechanical properties by combining with organic polymers, inorganic materials, or metal matrix, and can synergize a cross-linking effect of the monomer BA-TEPA with the olefin on the rubber, so that a dispersibility of the aerogel comprising the nano attapulgite and the phenolic aldehyde in the rubber is improved. The phenolic aldehyde has good flame-retardant properties and hydrophobicity, and a flame-retardant performance and a wet skid resistance of the rubber can be also improved.

DETAILED DESCRIPTION OF THE EMBODIMENTS

The technical solution of the present disclosure will be further described as follows in combination with the accompanying embodiments and drawings.

Embodiment 1

Figure 1:
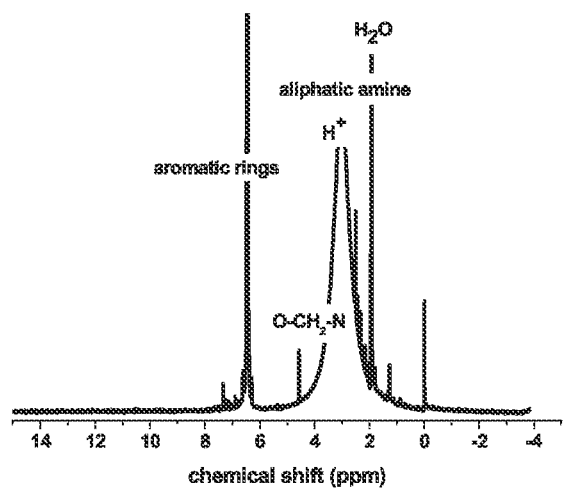
FIG. 1 illustrates a proton nuclear magnetic resonance spectrum of a BA-TEPA monomer of Embodiment 1 of the present disclosure.
Figure 2:
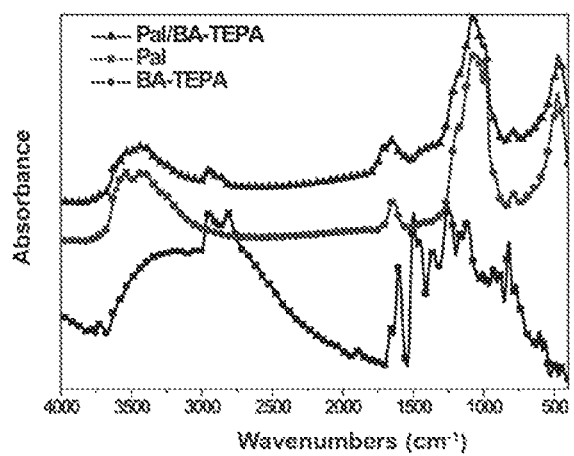
FIG. 2 illustrates an infrared spectrum of the BA-TEPA monomer of Embodiment 1 of the present disclosure.

(1) Preparation of a monomer BA-TEPA (i.e., phenolic monomer BA-TEPA):bisphenol A, tetraethylenepentamine (TEPA), and paraformaldehyde are dispersed (e.g., dissolved) in 100 mL of 1,4-dioxane, mechanically stirred in ice bath for 1 hour, heated to room temperature (e.g., 20-25° C.), and continually mechanically stirred for 8 hours to obtain a uniform yellow viscous fluid. Referring to FIGS. 1 and 2, which is the monomer BA-TEPA, a structural formula is as follows:

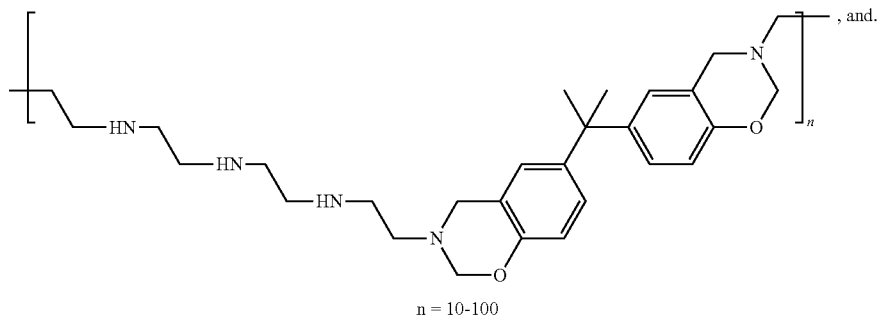

n = 10-100

A dose ratio of the bisphenol A, the tetraethylenepentamine, the paraformaldehyde, and the 1,4-dioxane is 1 mol: 1 mol: 4 mol: 100 mL. A reaction principle in which rubber is modified using the phenolic monomer BA-TEPA is as follows:

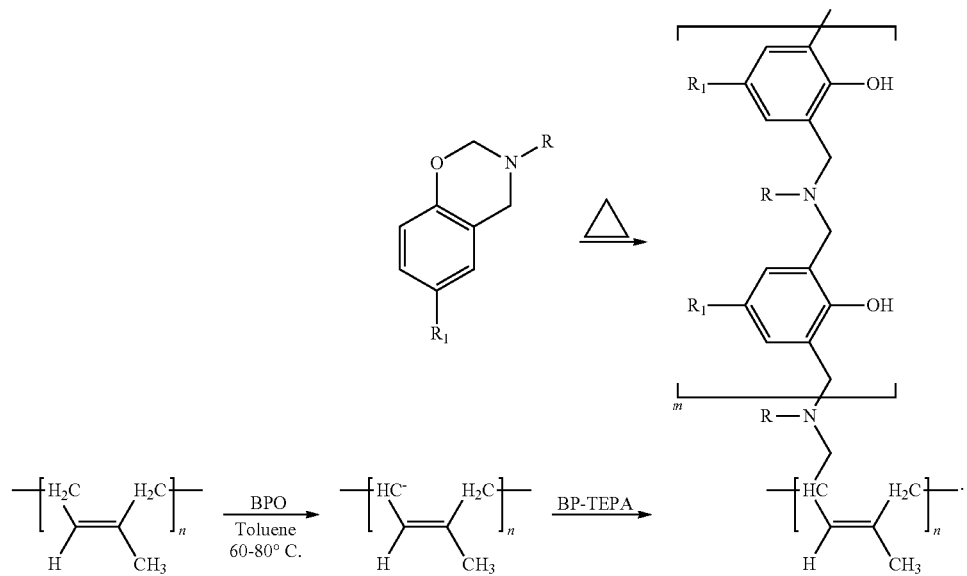

Figure 3:
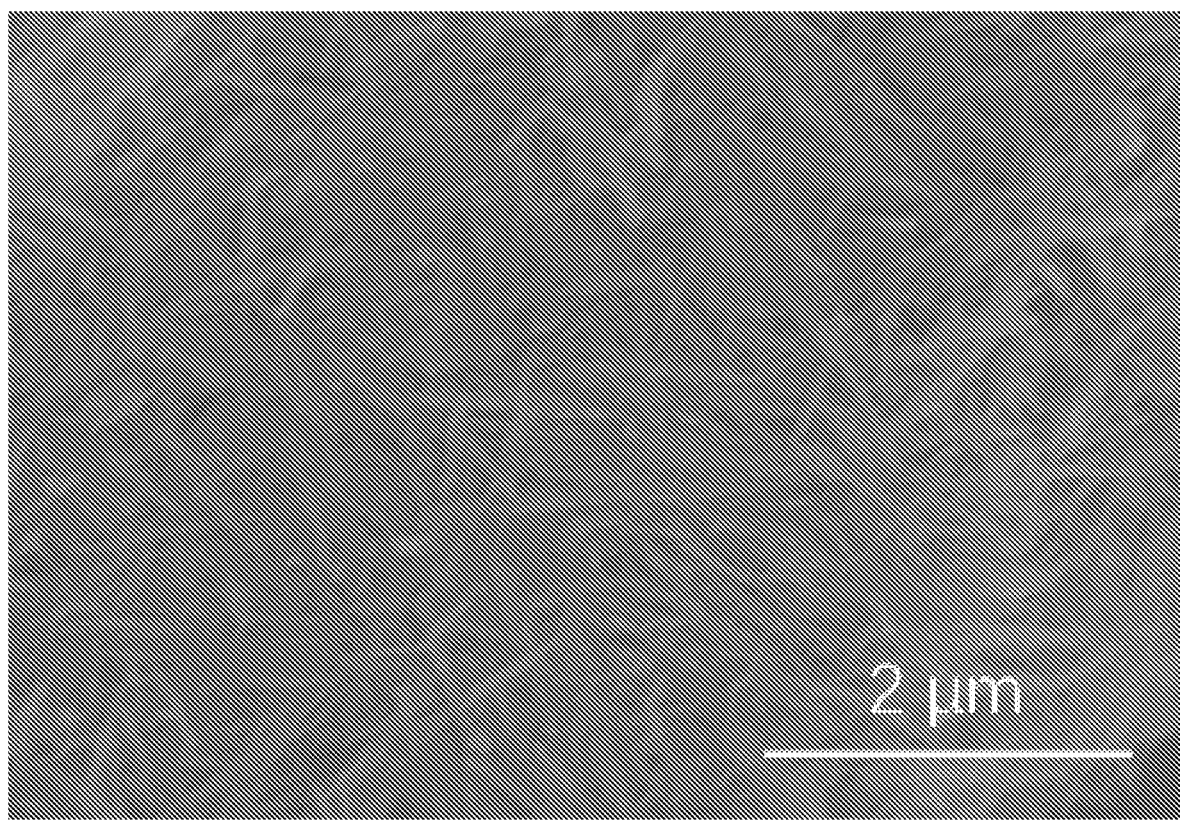
FIG. 3 illustrates a scanning electron micrograph (SEM) of nano attapulgite of Embodiment 1 of the present disclosure.

(2) Preparation of nano attapulgite: original attapulgite is dispersed in ultrapure water with a mass ratio of 1:20 and stirred for 1 hour, 1M (mol/L) of oxalic acid is added, hydrothermally processed at 140° C. for 6 hours, and then thermally processed at 120° C. for 24 hours or then thermally processed at 120° C. for 24 hours and washed to neutrality. Referring to FIG. 3, the nano attapulgite is then obtained.

(3) Preparation of aerogel: 0.25 g of the nano attapulgite is sonicated to be dispersed in 10 mL of 50/50 (vol/vol) water-ethanol solution, 1 wt % (weight percent) chitosan and 1 volume % (volume percent) acetic acid are added and stirred for 24 hours, 0.05 g of the phenolic monomer BA-TEPA is then added and uniformly stirred, 100 μL of formaldehyde is then added, stirred for 3 minutes, and then left to stand to form a gel. The gel is finally aged at 60° C. for 8 hours to form a nano attapulgite-phenolic wet gel.

(4) After the nano attapulgite-phenolic wet gel is substituted with an ethanol-water solvent with a volume ratio of 1:100 for 3 days and freeze-dried at −30° C. to maintain original gel space structure, and the aerogel comprising the nano attapulgite and the phenolic aldehyde is finally obtained.

3-12 weight distributions of the aerogel comprising the nano attapulgite and the phenolic aldehyde prepared in this embodiment, 80-100 weight distributions of rubber, 3-8 weight distributions of a white carbon black ($SiO_2 \cdot nH_2O$), 3-6 weight distributions of an anti-aging agent, 3-4 weight distributions of a heat stabilizer, and 3-5 weight distributions of a compatibilizing agent are mixed in an internal mixer, continually mixed, materials are then discharge to a cutting machine, a sheet is obtained by three processes, which including calendering, extruding, and molding, an abrasion-resistant rubber material for preparing an abrasion-resistant vehicle tire is obtained, and the abrasion-resistant rubber material defines a certain shape.

Control Example 1

In this control example, a chitosan-phenolic aerogel is prepared. This control example differs from Embodiment 1 in that: the step (2) is omitted, and 1 wt % (weight percent) chitosan and 1 volume % (volume percent) acetic acid are added and stirred for 24 hours. 0.05 g of the phenolic monomer BA-TEPA is then added and well stirred, 100 μL of formaldehyde is added and stirred for 3 minutes and then left to stand to form a gel. The gel is finally aged at 60° C. for 8 hours to form a chitosan-phenolic wet gel.

A preparation of a rubber material in this control example is the same as Embodiment 1.

Control Example 2

In this control example, a nano attapulgite-chitosan aerogel is prepared. This control example differs from Embodiment 1 in that: in step (3), 0.25 g of nano attapulgite is sonicated to be dispersed in a water-ethanol solution ($V_{H2O}/V_{EtOH}$=1:1), 1 wt % (weight percent) chitosan and 1 volume % (volume percent) acetic acid are added and stirred for 24 hours, 100 μL of formaldehyde is then added, stirred for 3 minutes, and left to stand to form a gel. The gel is finally aged at 60° C. for 8 hours to form a wet gel.

A preparation of a rubber material in this control example is the same as Embodiment 1.

An abrasion test condition of the abrasion-resistant rubber material prepared in Embodiment 1 and Control example 2 is as follows: sandpaper with a thickness of 120 A, a slip velocity of 10 m/min, a slip ratio of 5%, a load of 75 N, and a time of 15 minutes. Test data is shown in the following table:

| Sample | Abrasion weight (g) | | | | Specific gravity | Average abrasion volume (cm$^3$) |
| --- | --- | --- | --- | --- | --- | --- |
| | Sample 1 | Sample 2 | Sample 3 | Average | | |
| Control example 2 | 41.4887 − 41.3951 = 0.0936 | 40.4075 − 40.2730 = 0.1345 | 40.9765 − 40.8654 = 0.1111 | 0.113 | 1.126 | 0.102 |
| Embodiment 1 | 41.8475 − 41.7365 = 0.1110 | 40.9355 − 40.8265 = 0.1090 | 40.9588 − 40.8782 = 0.0806 | 0.100 | 1.109 | 0.089 |

Figure 4:
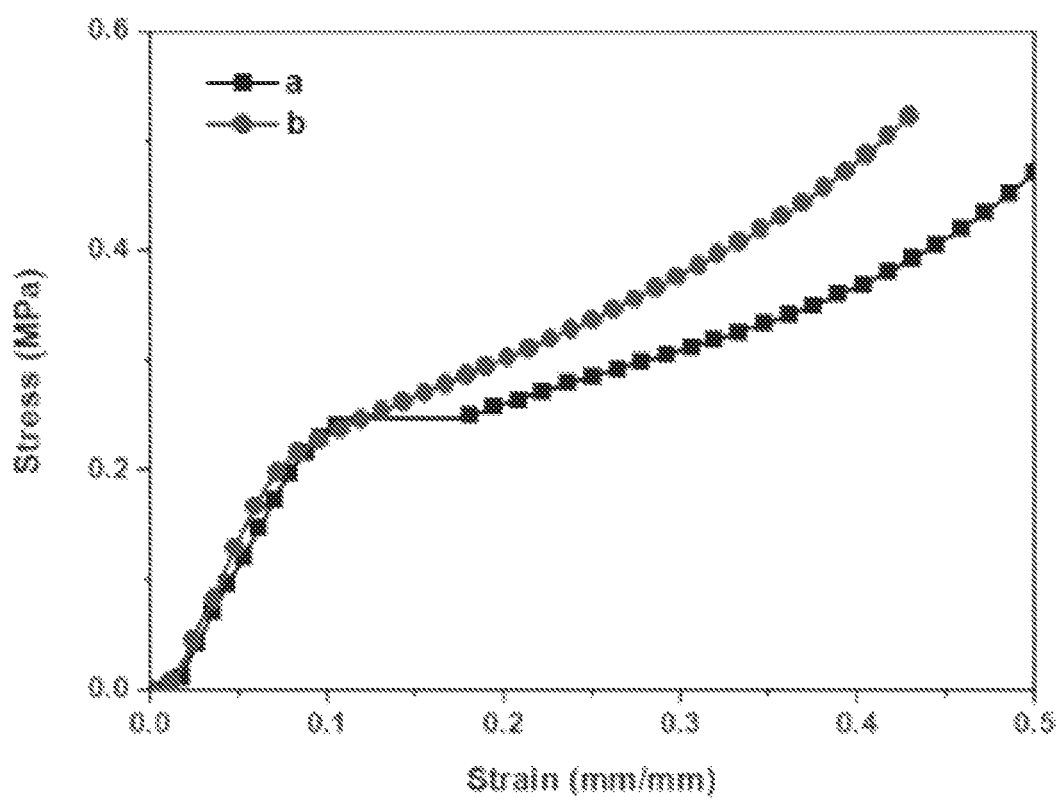
FIG. 4 illustrates stress-strain compression curves of chitosan and phenolic aerogel prepared in a control example 1 and the nano attapulgite and phenolic aerogel prepared in Embodiment 1 of the present disclosure, wherein curve a represents a stress-strain compression curve of the chitosan and the phenolic aerogel prepared in the control example 1, and curve b represents a compressive stress-strain curve of the nano attapulgite and the phenolic aerogel prepared in Embodiment 1.

Referring to FIG. 4, a curve a and a curve b are respectively compressive stress-strain curves of the aerogel comprising the nano attapulgite and the phenolic aldehyde prepared in Embodiment 1 and the chitosan-phenolic aerogel prepared in Control example 1, which indicates that the aerogel comprising the nano attapulgite and the phenolic aldehyde prepared in Embodiment 1 has better mechanical properties.

Figure 5:
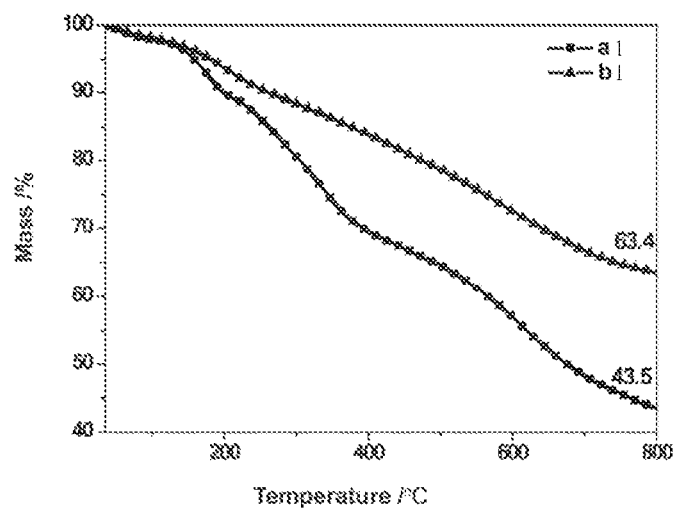
FIG. 5 illustrates thermogravimetric curves of nano-attapulgite and chitosan aerogel prepared in a control example 2 and the nano attapulgite and the phenolic aerogel prepared in Embodiment 1 of the present disclosure, wherein curve a1 represents a thermogravimetric curve of the nano-attapulgite and the chitosan aerogel prepared in the control example 2, and curve b1 represents a thermogravimetric curve of the nano attapulgite and the phenolic aerogel prepared in Embodiment 1.

Referring to FIG. 5, a curve a1 and a curve b1 are respectively thermogravimetric curves of the chitosan-phenolic aerogel prepared in Embodiment 1 and the nano attapulgite-chitosan aerogel prepared in Control example 2. Carbon-residue contents are respectively 63.4% and 43.5%, which indicates that the aerogel comprising the nano attapulgite and the phenolic aldehyde prepared in Embodiment 1 has a better flame-retardant effect.

It can be known from the above results that the abrasion-resistant rubber material prepared in the embodiment of the present disclosure can be used to prepare a heavy-duty vehicle tire.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A method for preparing an aerogel comprising nano attapulgite and phenolic aldehyde, comprising:

(1) dispersing bisphenol A, tetraethylenepentamine, and paraformaldehyde in 1,4-dioxane, stirring in an ice bath for 0.8-1.2 hours, heating to room temperature, continually stirring for 4-12 hours to obtain a monomer BA-TEPA, wherein a structural formula of the monomer BA-TEPA is as follows:

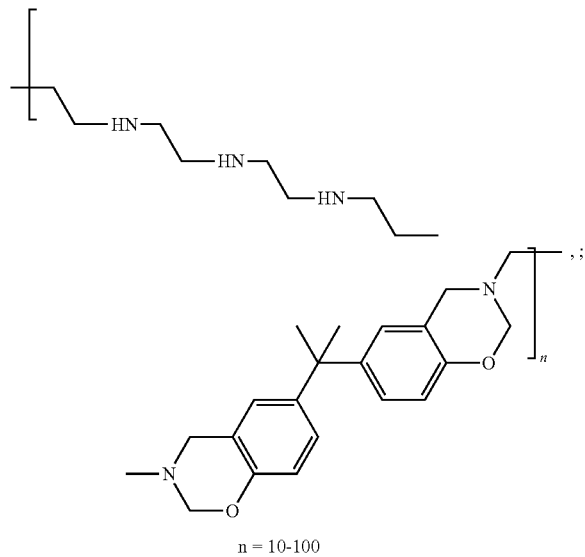

n = 10-100

(2) dispersing original attapulgite in ultrapure water, stirring for 0.8-1.2 hours, then adding oxalic acid, hydrothermally processing at 120-160° C. for 2-8 hours, then thermally processing at 80-140° C. for 10-40 hours, washing to neutrality to obtain nano attapulgite;

(3) sonicating to disperse the nano attapulgite prepared in step (2) in a 50/50 (vol/vol) water-ethanol solution, then adding chitosan and acetic acid, stirring for 20-25 hours, then adding the monomer BA-TEPA prepared in step (1), stirring to even, then adding formaldehyde, stirring for 2-4 minutes, then leaving to stand to form a gel, and finally aging the gel to form a wet gel; and (4) after substituting the wet gel prepared in step (3) with a solvent with a volume ratio of ethanol and water of 1-3:100 for 3-4 days, freeze-drying to obtain the aerogel comprising the nano attapulgite and the phenolic aldehyde.

2. The method according to claim 1, wherein a ratio of the bisphenol A, the tetraethylenepentamine, the paraformaldehyde, and the 1,4-dioxane is 1 mol-4 mol: 1 mol-4 mol: 4 mol-16 mol: 100 mL-500 mL.

3. The method according to claim 1, wherein:
a mass ratio of the original attapulgite and the ultrapure water is 1:5 to 1:30, and
the adding oxalic acid comprises adding the oxalic acid to a final concentration of 0.5-5 Mol/L.

4. The method according to claim 1, wherein a mass ratio of the nano attapulgite and the monomer BA-TEPA is 0.05-0.5:0.05-0.5.

5. The method according to claim 4, wherein a ratio of the nano attapulgite, the water-ethanol solution, and the formaldehyde is 0.05 g-0.5 g: 9 mL-11 mL:50μ-500 μL.

6. The method according to claim 1, wherein the aging the gel to form the wet gel comprises aging the gel at 20-70° C. for 6-30 hours.

* * * * *